(12) United States Patent
White

(10) Patent No.: US 11,264,807 B2
(45) Date of Patent: Mar. 1, 2022

(54) RENEWABLE ENERGY METERING SYSTEM

(71) Applicant: James Arnim White, Wenatchee, WA (US)

(72) Inventor: James Arnim White, Wenatchee, WA (US)

(*) Notice: Subject to any disclaimer, the term of this patent is extended or adjusted under 35 U.S.C. 154(b) by 0 days.

(21) Appl. No.: 16/589,132

(22) Filed: Sep. 30, 2019

(65) Prior Publication Data

US 2021/0098994 A1    Apr. 1, 2021

(51) Int. Cl.
| | |
|---|---|
| *B60L 50/60* | (2019.01) |
| *B60L 53/51* | (2019.01) |
| *H02J 13/00* | (2006.01) |
| *H02J 3/32* | (2006.01) |
| *H02J 3/38* | (2006.01) |
| *H02J 7/02* | (2016.01) |
| *H02J 9/06* | (2006.01) |

(52) U.S. Cl.
CPC ............. *H02J 3/383* (2013.01); *B60L 50/66* (2019.02); *B60L 53/51* (2019.02); *H02J 3/32* (2013.01); *H02J 7/022* (2013.01); *H02J 9/062* (2013.01); *H02J 13/0096* (2013.01); *H02J 9/068* (2020.01)

(58) Field of Classification Search
USPC ................................................ 307/9.1, 10.1
See application file for complete search history.

(56) References Cited

U.S. PATENT DOCUMENTS

| | | | |
|---|---|---|---|
| 4,672,520 A | 6/1987 | Ueda | |
| 7,058,524 B2 | 6/2006 | Hayes | |
| 7,648,389 B1 | 1/2010 | Scott | |
| 7,830,038 B2 | 11/2010 | Wang | |
| 7,915,760 B2 | 3/2011 | Evans | |
| 8,140,414 B2 | 3/2012 | O'Neil | |

(Continued)

FOREIGN PATENT DOCUMENTS

| | | |
|---|---|---|
| CN | 2246311 | 1/1997 |
| KR | 101920695 | * 11/2018 |
| WO | WO2012007831 | 1/2012 |

OTHER PUBLICATIONS

Global Power Products, Generlink—Installation Instructions Model MA23/24—N/S, Apr. 2004, Global Power Products, Lawrenceville, Georgia, USA.

(Continued)

*Primary Examiner* — Toan T Vu
*Assistant Examiner* — Xuan Ly
(74) *Attorney, Agent, or Firm* — Compton & Associates PLLC; Matthew Compton

(57) ABSTRACT

A customer's solar array is connected to a utility-owned battery and inverter system. The battery and inverter system may convert DC power from the solar array or a battery bank to provide AC power to the grid. The inverter system may also convert AC power from the grid to DC power to charge the battery bank, or the battery bank may be charged by DC power from the solar array. The utility's inverter system is connected to the customer's premise on the utility's side of the meter. A transfer switch provides either grid power to the premise or AC power from the inverter via the battery bank. A solar production meter on the utility side measures power flowing from the solar array to the grid, as well as power flowing between the battery bank and the grid.

3 Claims, 6 Drawing Sheets

(56) References Cited

U.S. PATENT DOCUMENTS

| | | | |
|---|---|---|---|
| 8,204,633 | B2 | 6/2012 | Harbin |
| 8,373,303 | B1 | 2/2013 | Daniels |
| 8,716,889 | B2 | 5/2014 | Vaidyanathan |
| 8,779,627 | B2 | 7/2014 | Gerhardinger |
| 8,937,822 | B2 | 1/2015 | Dent |
| 9,156,368 | B2 | 10/2015 | Chen |
| 9,559,521 | B1 | 1/2017 | King |
| 9,559,614 | B2 | 1/2017 | Eberhardt |
| 9,754,300 | B2 | 9/2017 | Kempton |
| 9,889,761 | B2 | 2/2018 | Lowenthal |
| 10,277,034 | B2 | 4/2019 | Marhoefer |
| 10,381,870 | B2 | 8/2019 | Forbes |
| 10,527,658 | B2 * | 1/2020 | Shon ............... H02J 13/00028 |
| 2007/0139220 | A1 | 6/2007 | Mirza |
| 2011/0036386 | A1 | 2/2011 | Browder |
| 2011/0172839 | A1 | 7/2011 | Brown |
| 2012/0118989 | A1 | 5/2012 | Buescher |
| 2013/0123997 | A1 | 5/2013 | King |
| 2014/0062192 | A1 | 3/2014 | Vichnyakov |
| 2015/0061644 | A1 | 3/2015 | Parks |
| 2015/0142347 | A1 | 5/2015 | Mohan |
| 2016/0176305 | A1 * | 6/2016 | James ............... B60L 53/11 307/26 |
| 2016/0181752 | A1 * | 6/2016 | Parks ............... G06Q 50/06 439/517 |
| 2016/0315498 | A1 | 10/2016 | Narla |
| 2017/0030950 | A1 | 2/2017 | Uebel |
| 2018/0041014 | A1 | 2/2018 | Cruz |
| 2018/0048159 | A1 * | 2/2018 | Narla ............... H01L 31/042 |
| 2018/0201142 | A1 * | 7/2018 | Galin ............... H02J 3/382 |
| 2019/0273393 | A1 * | 9/2019 | Chen ............... H02J 3/383 |

OTHER PUBLICATIONS

Global Power Products, Generlink—a new meter collar device that makes connecting a portable generator safe and easy, Aug. 2009, Global Power Products, Lawrenceville, Georgia, USA.

Global Power Products, Generlink—Operating Manual, May 2019, Global Power Products, Lawrenceville, Georgia, USA.

James White, Utility ownership of the inverter—Why it makes sense, Circa 2009, Chelan County Public Utility District, Wenatchee, Washington 98801, Washington State, USA.

Green Mountain Power, GMP Pioneers Patent-Pending System Using Energy Storage to Make Meters Obsolete, May 1, 2019, Green Mountain Power, Colchester, Vermont, USA.

Tarek Khalifa, A Survey of Communication Protocols for Automatic Meter Reading Applications, IEEE Communications Surveys & Tutorials, Jun. 2011, 168-182, 13(2), Institute of Electrical and Electronics Engineers, Piscataway, New Jersey, USA.

Christopher Freitas, 120 VAC / Single Inverter "Green Tag" KWH Metering, Circa 2004, Outback Power, Arlington, Washington State, USA.

Itron Inc, Centron® II Centron C12.19 C2ST, C2SD, C2SL, Jan. 2015, Itron Inc, Liberty Lake, Washington State, USA.

Itron Inc, Centron® Residential Meter, Apr. 2013, Itron Inc, Liberty Lake, Washington State, USA.

Ellen Lamiman, Solar Electric AC Production Metering in Washington State, Date unknown, WSU Extension Enery Program, Washington State, USA.

James White, Alternative Utility Business Models for Solar—Concepts, Benefits, and Challenges, Apr. 7, 2014, 2014 Engineering & Operations Technical Conference, Oklahoma City, Oklahoma, USA.

Itron Inc, Centron® II, Gen™5 Centron II, May 2019, Itron Inc, Liberty Lake, Washington State, USA.

LG Chem, Resu, Installation Manual for RESU10H, Circa 2016, LG Chem, Seoul, Republic of Korea.

Manfred Sneps-Sneppe, On M2M communications standards for smart metering, Jun. 2013, Cornell Univ., ArXiv.org, Ithaca, New York, USA.

National Electrical Manufacturers Association, NEMA UTN P1-2019—Electric Utility Communications Networks, Circa Apr. 2019, National Electrical Manufacturers Association, Rosslyn, Virginia, USA.

Outback Power, Application Note—How To AC Couple Grid Tied Inverters with OutBack Frequency Shifting Inverters, Feb. 22, 2019, Outback Power, Arlington, Washington State, USA.

Solaredge Technologies, Inc., Application Note: SolarEdge Fixed String Voltage, Concept of Operation, Feb. 2019, SolarEdge Technologies, Inc., Fremont, California, USA.

Solaredge Technologies, Inc., SolarEdge Single Phase StorEdgeTM Solutions for North America, Aug. 2017, SolarEdge Technologies, Inc., Fremont, California, USA.

Silfab Solar Inc., SLA-M 310 Wp 60 Cell Monocrystalline PV Module, Circa Jun. 2019, Silfab Solar Inc., Mississauga, Ontario, Canada.

James White, How a DC Utility Meter Can Transform the U.S. Solar Industry, Circa 2013, Chelan County Public Utility District, Wenatchee, Washington 98801, Washington State, USA.

Solaredge Technologies, Inc., StorEdge Solution Applications Connection and Configuration Guide, Circa 2017, SolarEdge Technologies, Inc., Fremont, California, USA.

Solaredge Technologies, Inc., Installation GuideStorEdge Solution with Backup, Feb. 2019, SolarEdge Technologies, Inc., Fremont, California, USA.

James White, Sub-Metering Scoping Study, Dec. 2012, Electric Power Research Institute (EPRI), Palo Alto, California, USA.

Iulia Gheorghiu, Green Mountain Power pilots Tesla batteries as meters, May 2, 2019, Industry Dive, Washington, DC, USA.

Tesla, Inc., Wall Connector, 8OA Single Phase Installation Manual, May 2018, Tesla, Inc., Palo Alto, California, USA.

\* cited by examiner

The "Duck Curve"

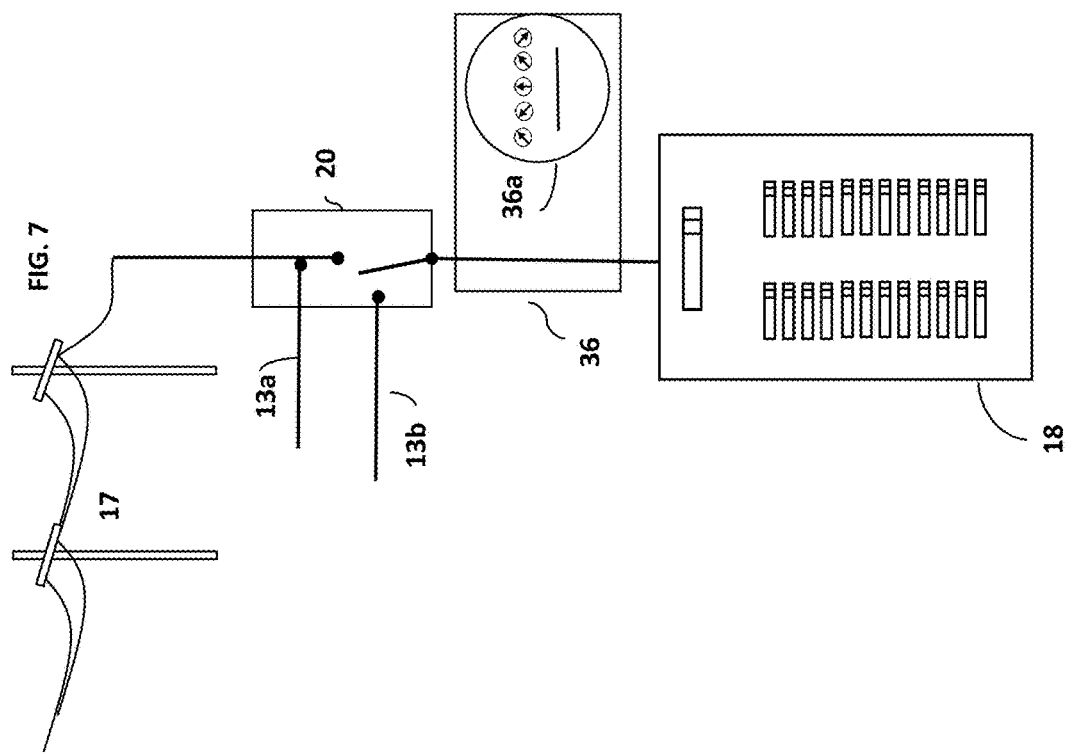
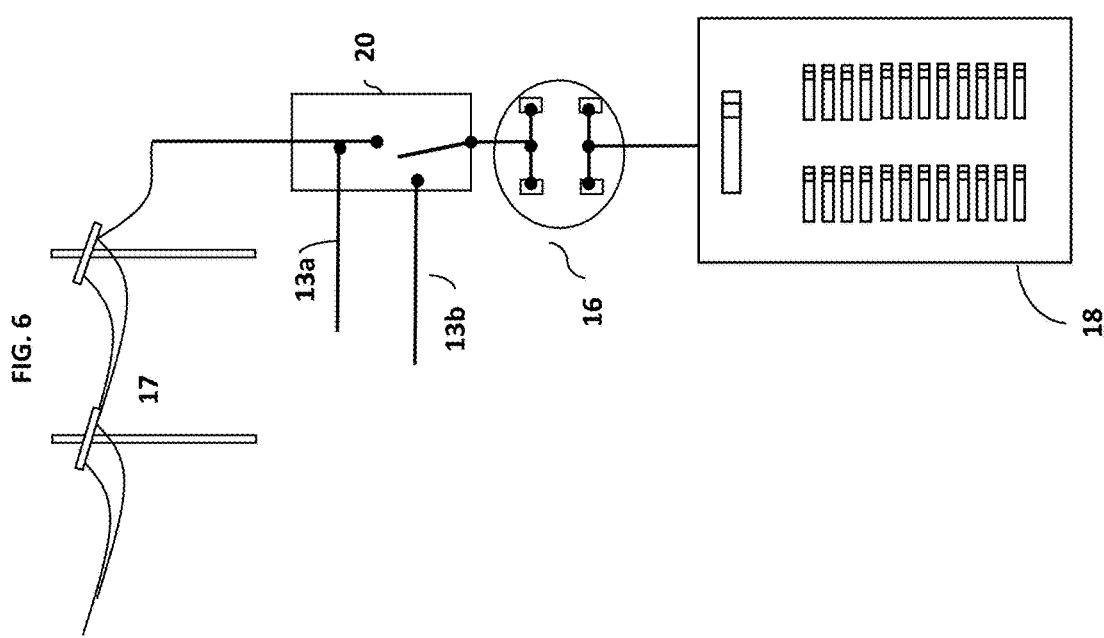

US 11,264,807 B2

RENEWABLE ENERGY METERING SYSTEM

FIELD OF THE INVENTION

The present invention relates generally to distributed generation, electric vehicle charging, metering, storage, and transmission of solar photovoltaic energy.

BACKGROUND OF THE INVENTION

Many things are keeping residential and commercial solar power installations from being installed throughout the United States on a massive scale. One of the main reasons is that existing solar power systems do not satisfy all of the needs of electric utilities or their customers. While there are benefits of distributed solar photovoltaic (PV) systems, electric utilities lose direct revenue from net metering, and most customers who have solar power systems on their roof cannot use them to provide emergency power to their home or business during outages. The additional expense of a battery back-up system and installing a critical load sub-panel are hard to cost-justify when they are only needed 0.01% of the time.

Because of safety concerns for their utility workers, and an immediate loss of utility revenue from net metered solar power systems without an immediate and equal reduction in costs, few electric utility companies offer simple and easy ways for customers to connect their solar system to the electric utility grid. The end result is a general lack of enthusiasm for net metering systems by electric utilities, long drawn out interconnection agreements, extended review periods, application and permitting fees, electrical inspections, redundant disconnect switches, and the list goes on and on.

In 2017, these non-equipment "soft costs" represented 68% of a residential system's total installed cost of $2.80 per watt. Because of these high soft costs, solar installations on residential and commercial buildings are far more expensive in the United States than they are in Germany or other countries. Utilities are looking for cost-effective solar generation and energy storage solutions to eliminate the massive late afternoon generation ramp illustrated by the infamous "duck curve" shown in FIG. 4.

Customers are looking for a solar power systems on their home or business that provide for their electrical needs using clean renewable power that costs less than what they are currently paying; does not require a lot of up-front money; provides an economic return on their investment; and has the ability to provide back-up power for their home or business when the power goes out.

Electric utilities want a solar power generation system that: does not put upward pressure on rates; improves the reliability of their system; is safe for their workers; helps them meet their renewable energy requirements; can produce power anytime during the day or night to meet their power demands; provides an economic rate of return on their capital investments; and maintains or enhances their long-term economic viability. Utilities are often not even able to count net metered solar generation toward meeting their renewable energy requirements. Except for being safe for electric utility workers, net metered residential and commercial solar power systems in the United States do not provide any of these benefits for electric utilities.

BRIEF SUMMARY OF THE INVENTION

The various embodiments of the present invention described herein may provide some or all of the above benefits for electric utilities and their customers. With respect to a generalized embodiment, a customer's solar array is connected to a utility-owned battery and inverter system. The battery and inverter system may convert DC power from the solar array or a battery bank to provide AC power to the grid. The inverter system may also convert AC power from the grid to DC power to charge the battery bank, or the battery bank may be charged by DC power from the solar array. The utility's inverter system is connected to the customer's premise on the utility's side of the meter. A transfer switch provides either grid power to the premise or AC power from the inverter via the utility's battery bank and customer's solar array. A solar production meter on the utility side measures solar energy generation, that is independent of any additional power that the utility may choose to exchange between the battery bank and the grid.

Such a generalized embodiment of the present invention as thus described provides benefits not obtainable with present day systems. Because the solar generation is on the utility's side of the meter, electric utilities do not lose any revenue from the solar power system because the solar production does not affect the customer's consumption meter. Using their existing automatic metering infrastructure, utilities have the freedom to choose when and how much solar power generation gets added to their grid.

Customers continue to pay for all the energy they consume, but they will get paid for 100% of their solar generation at a wholesale rate that provides them a rate of return for their solar investment. Utilities will purchase raw DC solar power from their customers at this wholesale price, and then transform it into AC power that the utility can resell to customers at their full retail electric rate any hour of the day. This avoids the current net metering business model that is not sustainable for many utilities. Permitting and inspection costs are dramatically reduced because electric utilities do not need permits to work on their own power generating equipment. Interconnection costs are also reduced because the utility owns and controls all of the equipment that interacts with their grid.

BRIEF DESCRIPTION OF THE DRAWINGS

The drawings are provided for purposes of illustration only, and merely depict typical or example embodiments of the invention. These drawings are provided to facilitate the reader's understanding of the invention and shall not be considered as limiting of the breadth, scope, or applicability of the invention.

FIG. 6 depicts a schematic view of an alternative embodiment of the invention utilizing an automatic transfer switch.

FIG. 7 depicts a schematic view of an alternative embodiment that utilizes a metering cabinet.

DETAILED DESCRIPTION

Several aspects of embodiments of the invention are described below with reference to example applications in the attached figures for illustration. It should be understood that numerous specific details, relationships, and methods are set forth to provide an understanding of the invention. One skilled in the relevant art, however, will readily recognize that the invention can be practiced without one or more of the specific details or with other methods.

In other instances, well-known structures or operations are not shown in detail to avoid obscuring various aspects of different embodiments of the invention. The present invention is not limited by the illustrated ordering of acts or events (unless a certain order is explicitly necessary), as some acts may occur in different orders and/or concurrently with other acts or events. Furthermore, not all illustrated acts or events are required to implement a methodology in accordance with the present invention.

Figure 1:
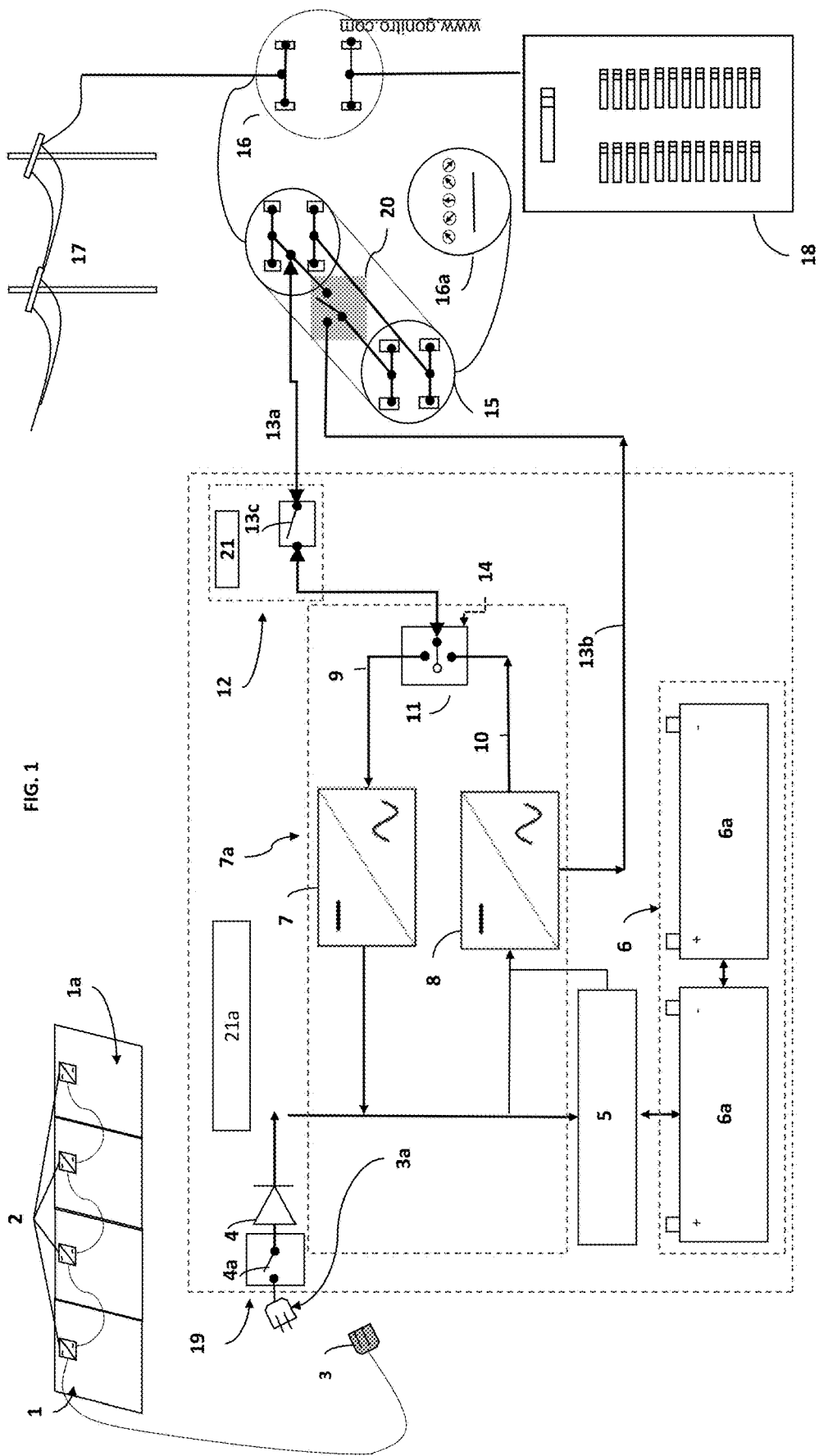
FIG. 1 depicts a schematic view of a residential embodiment of the invention with respect to a typical single-family dwelling.

Referring to FIG. 1, a schematic view is presented with respect to an embodiment of the present invention. A solar array 1 comprises one or more solar panels 1a (sometimes referred to in the art as a solar module) that output direct current (DC). In a typical installation, the solar array 1 is mounted on the roof of the premise.

A solar panel 1a may have a voltage optimizer 2 (sometimes referred to in the art as a power optimizer) that, in general terms, acts as a DC-to-DC converter to allow the solar panel to function at its maximum power point tracking (MPPT) by converting the DC voltage and current levels provided by the solar panel to an optimal DC voltage and current level that maximizes the power output while also matching the inverter and/or battery voltage. The solar array is connected to a battery and inverter system 19. Alternatively, renewable power sources such as a wind turbine, a hydropower turbine, or a geothermal powered turbine may be used in place of the solar array and connected in like manner to the battery and inverter system 19.

In some embodiments of the invention, the connection between the solar array and the battery and inverter system 19 is made through a "touch-safe" high voltage DC plug 3 and corresponding socket 3a, similar to, or the same as, those used in charging electric vehicles. The DC plug 3 provides a safe, easy to use utility service disconnect switch that is lockable, and has a visible air-gap that is used to disconnect the solar array 1. In some embodiments where the utility owns the inverter system 7a, this DC plug 3 is the official jurisdictional boundary that separates utility-owned and customer-owned equipment for code and clearly designates who has the ability to work on the system. In some embodiments, the customer-owned solar array and plug 3 are governed by the National Electric Code (NEC), and the utility owned socket 3a, inverter and battery are governed by the electric utility's safety standard known as the National Electric Safety Code (NESC). This disconnect also benefits persons such as customers, installers, firefighters, and utility workers who need to isolate the power from the solar array for safety reasons. Also, the DC plug 3 may be used to plug directly into an electric vehicle for direct DC-to-DC charging, or be used to power other devices. The socket 3a may have an option locking cover that physically impedes connecting the DC plug 3 into the socket 3a. Other connections or plugs may be also used such as the open standard CHAdeMo plugs, Combo Charging System (CCS) plugs, or the proprietary Tesla AC/DC plug.

Battery and inverter system 19 shown in FIG. 1 comprises various components, which may be, but need not be, combined in a single housing or located proximate to each other. The solar array 1 is connected to a DC-to-AC (alternating current) inverter 8. The solar array 1 is also connected to a battery management system 5. In FIG. 1, the solar array 1 is connected to the battery management system and an AC-to-DC inverter 7. A diode 4 may be used in some circumstances to stop power from flowing back into the solar array 1. A DC disconnect switch 4a may also be used for safety purposes.

The battery management system 5 is connected to a DC-to-AC inverter 8, as well as to an AC-to-DC inverter 7. The battery management system 5 receives power from the AC-to-DC inverter 7 and/or the solar array 1 to charge a battery bank 6. The battery management system 5 provides power to DC-to-AC inverter 8. In FIG. 1 the battery management system 5 is connected to solar array 1 to DC-to-AC inverter 8. Some modern devices such as the Solar Edge StorEdge™ SE7600A line of products combine an AC-to-DC inverter 7 and a DC-to-AC inverter 8 into an inverter system 7a.

Battery bank 6 comprises one or more rechargeable cells 6a. The battery management system 5 controls the charging and discharging of the battery bank 6. The battery management system 5 acts to ensure that the battery bank 6 and its rechargeable cells 6a operates within specific safety margins with respect to battery temperature, charge state, charging voltage, charging current, output voltage, output current, and so forth. The battery management system 5 also monitors and records various data points such as the charge state of the battery bank 6 (and/or each individual cell 6a), number of charge/discharge cycles, state of health with respect to remaining capacity of the battery bank 6 (and/or each individual cell 6a) as a percentage of its original capacity. The batter management system 5 may also control battery cooling and battery balancing.

A safety switch (not shown) may be present between the battery bank 6 and the battery management system 5 to isolate the battery bank 6 from the inverters (7 and 8) and/or the solar array 1. In a preferred embodiment, the cells are rechargeable lithium-ion batteries, but other types of rechargeable batteries such as lead acid or nickel metal hydride (or other electrical storage types such as supercapacitors) may be used. In some embodiments, the battery management system 5 and battery bank 6 may be incorporated together in a housing separate from the inverters (7 and 8) and the solar production meter 12. In another alternative embodiment, the battery bank 6 is housed separately from the battery management system 5. Housing the battery bank 6 and/or the battery management system 5 separately from the remaining portions of the battery and inverter system 19 offers additional safety and installation options for various types of buildings. As will be described later in FIG. 5, the batteries 72 of an electric vehicle 71 may also be used for energy storage.

AC-to-DC inverter 7 receives AC power from an electric utility grid 17 through a Grid AC In Line 9 and supplies DC power for use by the battery management system 5 to charge the battery bank 6. In FIG. 1, power consumed by AC-to-DC inverter 7 from the electric utility grid 17 is metered by a solar production meter 12. DC-to-AC inverter 8 receives DC power from the battery bank 6 and/or the solar array 1 and supplies AC power to the electric utility grid 17 through a Grid AC Out Line 10 for use by other electric utility customers. Power transferred from the DC-to-AC inverter 8 to the electric utility grid 17 is metered by a solar production meter 12.

In FIG. 1, solar production meter 12 supports bi-directional metering which allows for the independent metering of power flowing from the electric utility grid 17 to the AC-to-DC inverter 7, as well as from the DC-to-AC inverter 8 to the electric utility grid 17. The inverter system 7a also has a switch 14 which may be remotely operated to switch between various states. One state 11, shown in FIG. 1, is an "off" state where the AC-to-DC inverter 7 and the DC-to-AC inverter 8 are electrically isolated from the electrical line 13*a* between the solar production meter 12 and the electric utility grid 17.

In a second state, the DC-to-AC inverter 8 receives DC power from the battery bank 6 and/or the solar array 1 and supplies AC power to the electric utility grid 17 through a Grid AC Out Line 10 for use by other electric utility customers. Power so transmitted is metered and recorded by the solar production meter 12 in a first register (register 1) as power going out to the electric utility grid 17.

In a third state, the AC-to-DC inverter 7 receives AC power from the electric utility grid 17 through the Grid AC In Line 9 to the extent needed by the battery management system 5 to charge the battery bank 6. Power so transmitted is metered and recorded by the solar production meter 12 in a second register (register 2) as power coming in from the electric utility grid 17.

A third register (register 3) in the solar production meter 12 may comprise the total kWh (kilowatt hours) going to the grid 17 minus the total kWh coming from the grid. The values in these three registers may be displayed on the display 21 of the solar production meter. The total amount of the solar generation is not just the "net amount" shown in register 3, it may in some embodiments also account for the additional energy imported by the electric utility, less the round-trip energy efficiency loss for energy sent by the utility to the battery and then returned back to the utility. To accurately calculate the customer's total AC kWh solar generation for a given period, the following formula may be used:

Total Solar kWh Generation=(Change in Register 1−Total kWh going TO grid in Period)−[(Change in Register 2−Total kWh coming FROM grid in Period)/(Battery AC-to-DC-to-AC Round Trip Efficiency Coefficient)]

The above calculations may be done automatically by the utility's existing billing system after the meter reads have been collected and input into their meter reading systems.

Many modern electric meters also have one way and/or bi-directional radio frequency (RF) communication capabilities (RF mesh, public or private cellular, licensed or unlicensed wireless, etc.) to allow for remote transfer to or from the meter of information and/or commands. This allows for remote transmission of metering data from the meter to the utility company. It also allows for signals to be sent from the utility company to the meter to perform certain acts, such as remote reprogramming, disconnect/reconnect, or to control the flow of power between the inverter system 7*a* and the grid. Utilities can remotely turn off the meter 13*c* switch during the day to store solar energy in the battery, and then turn on the solar meter 13*c* switch to feed the stored solar power to the grid during the evening or early morning hours when the utility needs that energy. In some cases, solar meter switch 13*c* may also serve as an override to switch 14 in cases where, for example, the utility desires to override the inverter system's 7*a* profile that controls the switching of switch 14

Various communication protocols and platforms presently exist in the market that support these features. In order to support multiple types of communications, modern electric meters may have a one or more internal ports to connect a desired communication module to the meter. An example of these types of meters includes the CENTRON® II Gen5 Residential Meters currently manufactured by Itron of Liberty Lake, Washington. Various equivalent protocols also exist that utilize the utility grid lines, or fiber optic lines, instead of (or in conjunction with) RF transmissions for communications between the electric meter and the utility company. Modern smart meters, such as the Centron® II Gen5 have a remote disconnect switch 13*c*. This switch is normally used to cut electrical power to customers who do not pay. In FIG. 1, the remote disconnect which disconnects the solar production meter 12 from the electric grid 17 to stop the flow of power from the grid 17 to the AC-to-DC inverter 7 (or the inverter system 7*a*).

Modern inverter systems such as the Solar Edge StorEdge™ SE7600A line of products support some form of smart energy management such as export control, time-of-use shifting, maximized self-consumption, demand response, and peak shaving capabilities. The inverter system 7*a* has a programmable profile that ultimately controls the switching of switch 14 between various states.

In some embodiments, the switch 14 may be operated at certain times or in certain circumstances to achieve various goals. For example, during periods of excess electrical production (e.g., excess wind generation in the middle of the night) it may be advantageous to divert and store a portion of the excess production in the battery bank 6. In such a case, the inverter system 7*a* profile adjusts the state of the switch so that power may flow from the electric utility grid 17 through the Grid AC In Line 9 to the AC-to-DC inverter to charge the battery bank 6, if recharging is appropriate as determined by the battery management system 5.

At other times, for example during peak power loads in the summer, it may be advantageous to supply the electric utility grid 17 with power from the battery bank 6 and/or the solar array 1. In such a case, the state of the switch is set so that power may flow from the solar array 1 and/or the battery bank 6 through the DC-to-AC inverter 8 and then through the Grid AC Out Line 10 to the electric utility grid 17.

Modern inverter systems such as the Solar Edge StorEdge™ SE7600A line of products also support short-range bidirectional communication systems such as Zigbee. Zigbee is an IEEE 802.15.4-based specification for a suite of high-level communication protocols used to create personal area networks with small, low-power digital radios. Modern smart meters such as the CENTRON® II Gen5 Residential Meters likewise support Zigbee. This allows for a network connection from the utility to the meter 12 to the inverter system 7*a* to program and/or update the solar production meter 12 as well as the energy profile of the inverter system 7*a*.

Modern inverter systems such as the Solar Edge StorEdge™ SE7600A line of products also support ethernet connections, allowing for an Internet connection from the inverter system 7*a* through various setups such as residential connections or private utility networks. This likewise permits the utility to control the inverter system 7*a* and its profiles remotely. It (as well as the Zigbee connection) may also allow for information about the battery's state of charge, number of charge/discharge cycles, battery health, and other information about the state of the battery to be conveyed back to the utility.

Figure 2:
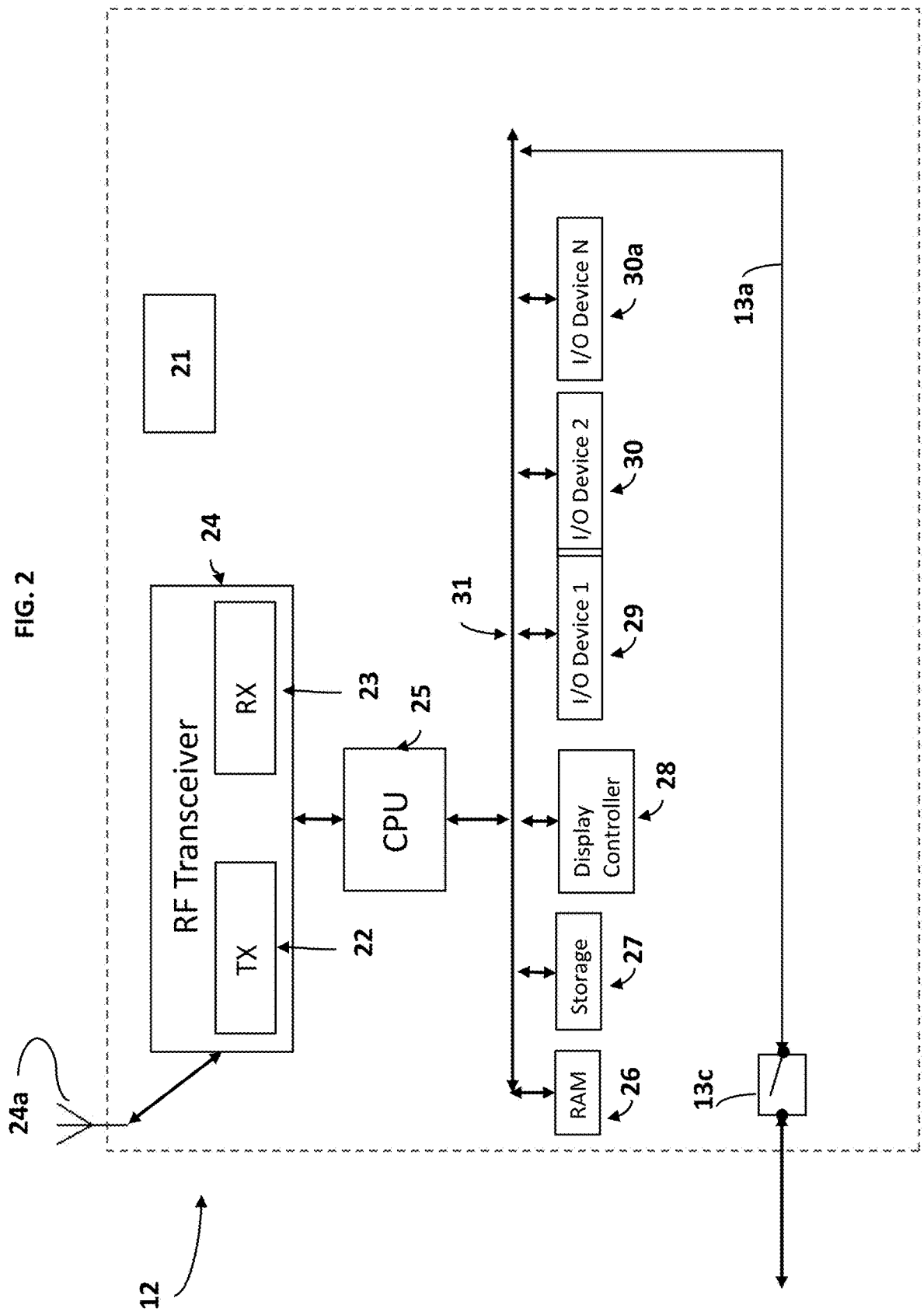
FIG. 2 depicts a simplified, logical block diagram of a portion of a solar production meter that controls a switch that may be operated remotely.

FIG. 2 is a simplified, logical block diagram of certain parts of the solar production meter 12. The solar production meter 12 comprises, in a preferred embodiment, a RF transceiver 24 connected to an antenna 24*a*. The RF transceiver 24 comprises a RF receiver 23 for receiving remote signals and a RF transmitter 22 for sending signals to a remote device. The RF transceiver 24 is connected to a central processing unit (CPU) 25. The CPU 25 may have a single or multiple processors. The CPU 25 may be connected by a bus 31 (which may be a single bus or a separate busses for each connected component) and/or dedicated I/O ports (not shown) to various components. In particular, CPU 25 may be connected to random access memory (RAM) 26, non-volatile storage 27, display controller 28, and various I/O devices 29-30a (such as a Zigbee transceiver).

Random access memory 26 is used by the CPU 25 in executing various operations. Non-volatile storage 27, in a preferred embodiment, is solid-state NAND flash memory but other technologies may be used. Non-volatile storage 27 stores the operating system and/or programs necessary to operate the meter 12 and the various data points, logs, commands, and other information generated and/or received by the meter 12. The CPU 25 may also be connected to various I/O devices 29-30a. Among these I/O devices are metering circuits to measure the power flowing to and from the grid, temperature sensors, various types of serial ports (USB, RS232, RS485), external switches, and so forth. In one embodiment, an operating system is run by the CPU 25 which supports various routines, applications, task schedulers, database management programs, sensor monitoring, I/O functions, and remote communications.

In some embodiments, remotely controlled switch 13c is also connected to the CPU 25 such that the CPU 25 can set the state of the remotely controlled switch 13c to a desired state. In a preferred embodiment, the remotely controlled switch 13c may be operated by the utility at certain times or in certain circumstances to achieve various goals. For example, switch 13c might also be used to perform managed charging of an electric vehicle's battery as shown in FIG. 7. To prevent the Electric Vehicle Service Equipment ("EVSE") 70 from charging during peak hours of the year, the electric utility may choose to turn off switch 13c. This will prevent AC power consumption from the EVSE 70, but still allow the vehicle to be charged with DC power from the solar array 1.

In other situations, it may be advantageous to completely isolate the solar array 1 and the battery bank 6 from the electric utility grid 17. Such times may include periods where there is an excess of solar generation, excessive line voltages, or to prevent reverse current on a distribution feeder. In such a case, the utility may send a signal comprising instruction(s) (the instruction(s) to be received by the RF transceiver 24 and processed by the CPU 25) to set the state of the remotely controlled switch 13c to a disconnected state where the AC-to-DC inverter 7 and the DC-to-AC inverter 8 are electrically isolated from the electric utility grid 17. Conversely, the utility may send a signal comprising instruction(s) (the instruction(s) to be received by the RF transceiver 24 and processed by the CPU 25) to set the state of the remotely controlled switch 13c to a connected state where the inverter system 7a is connected to the electric utility grid 17.

In this and other examples, the remotely controlled switch 13c is described as integrated into the solar production meter 12, but it need not be. The remotely controlled switch may be a stand-alone unit with its own RF transceiver, CPU, RAM, Storage, and programming. Alternatively, it may be integrated into the inverter system 7a.

In addition to (or as a replacement for) display 21 of the solar production meter 12, a status display 21a may also be included. The status display is connected to the battery management system 5 and the solar production meter 12 and displays data from these two systems such as present and/or total solar power generation, solar array voltage and electrical current presently being outputted by the solar array, present and/or total power received from the electric utility grid 17, present and/or total power provided to the electric utility grid 17, battery bank charge level, error messages, and other data gathered or computed by the battery and inverter system 19.

Figure 3:
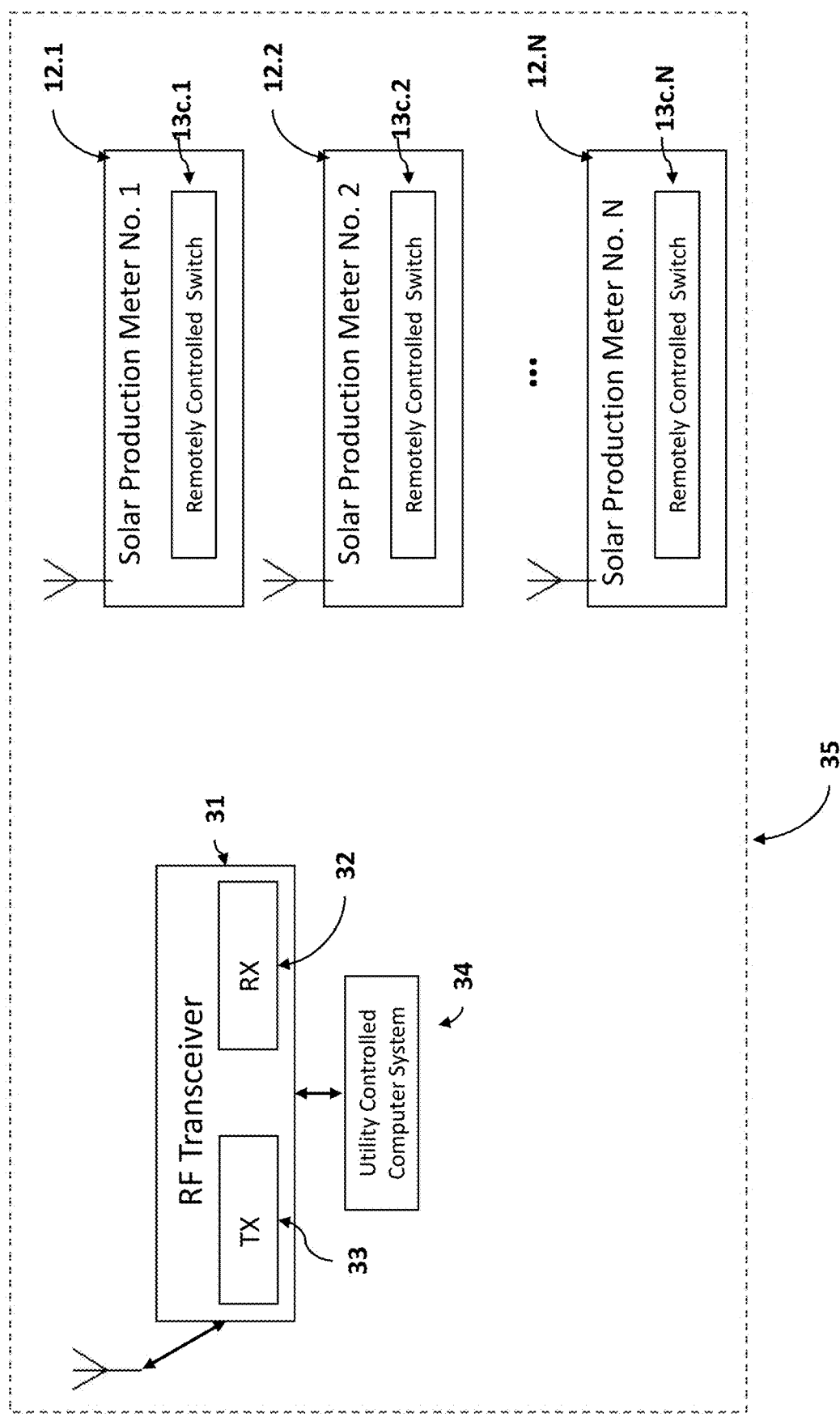
FIG. 3 depicts simplified, logical block diagram of a utility-controlled communication network of a neutral network topology.
Figure 4:
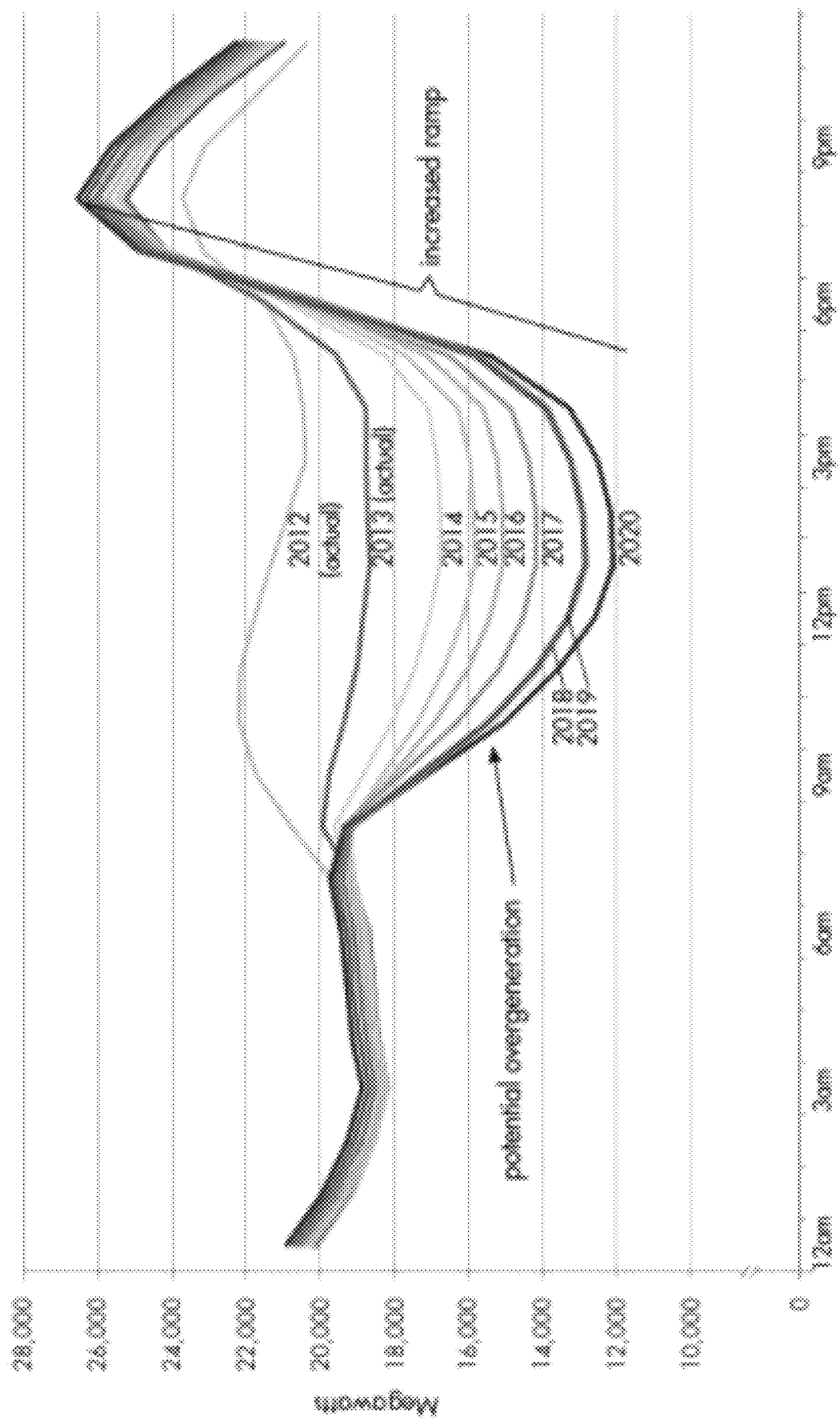
FIG. 4 depicts a graph of a phenomena known as the "Duck Curve.".

FIG. 3 is a simplified, logical block diagram of a utility-controlled communication network 35. The utility-controlled communication network 35 has a utility-controlled computer system 34 that communicates with solar production meters 12.1-12.N (each solar production meter representing a different residential system with its own solar array, battery, inverter system, and grid connection) under the utility's control through an RF transceiver 31 comprising a transmitter 33 and a receiver 32. The solar production meters 12.1-12.N communicate metering data, requests, battery charge state, solar array state, and other information to the utility-controlled computer system 34. And the utility owned computer system 35 sends commands (including instructions to change the state of the remotely controlled switch 13c.1-13c.N), requests, data, and other information to one or more of the solar production meters 12.1-12.N as desired. The utility, through the utility-controlled computer system 34, decides what states the various remotely controlled switches 13c.1-13c.N should be in based on the various factors relevant to that state (such as current grid load, electrical prices, grid status, local weather, safety concerns, and so forth).

FIG. 3 is intended to be a neutral example with respect to network topology. An electrical utility that covers a large area may utilize multiple transceivers, each communicating only with certain groups of solar production meters. Or, the solar production meters may be grouped under the control of a node that is itself controlled by the utility-controlled computer system 35 whereby instructions sent by the utility-controlled computer system 34 to a node are translated or interpreted into responsive instructions sent by a node to one or more solar production meters. Additionally, the utility-controlled communication network 35 need not be entirely owned and/or controlled by the utility—it may also utilize, in whole or in part, public (e.g., the Internet) and/or private communication networks owned and controlled by others, but which permits certain users (e.g., clients) to access the network.

Referring back to FIG. 1, the solar production meter is connected to the electric utility grid 17 "in front of" the customer's consumption meter base 16 through electrical line 13a such that power flowing from the electric utility grid 17 through the solar production meter 12 and then on to the battery bank 6 is not metered by the customer's consumption meter 16a. Likewise, power flowing from the solar array 1 or the battery bank 6 to the electric utility grid 17 is also not metered by the customer's consumption meter 16a.

The customer's consumption meter 16a is a standard utility revenue-grade electric meter that measures typical electrical consumption. "Behind" the customer's consumption meter base 16 are one or more electrical panels 18 which provide circuit breakers and busbars for the home's AC electrical circuits such that power consumed by the devices (refrigerator, water heater, air conditioner, oven, lights, computers, etc.) in the residence is metered by the customer's consumption meter 16a. Customer's consumption meter 16a may also communicate with a utility-controlled computer system 34 in a similar or identical fashion as a solar production meter 12.

A potential advantage to a building with a solar array 1 and/or a battery bank 6 is that these may be utilized to provide power in cases where all or part of the electric utility grid 17 is inoperative, for example when powerlines are damaged during storms or during blackouts. When power is not available from the electric utility grid 17, an automatic transfer switch 20 automatically senses the condition, automatically disconnects the grid 17 from the customer's consumption meter base 16, and then automatically connects the Emergency AC Out Line 13b to (and "in front of") the customer's consumption meter base 16. Power may then flow from the solar array 1 and/or the battery bank 6 through the Emergency AC Out Line 13b, then through the customer's consumption meter base 16, and then to the electrical panel 18. When the automatic transfer switch 20 automatically senses that the electric utility grid 17 is operative, it automatically disconnects the Emergency AC Out Line 13b from the customer's consumption meter base 16, and then automatically reconnects the grid 17 to the customer's consumption meter base 16.

For ease of wiring and installation, a meter socket adapter 15 (also called a renewable meter adapter) may be used. The use of the meter socket adapter 15 allows for quick and easy installation of electrical line 13a into existing residential infrastructure. Otherwise, interconnecting the electrical line 13a would require additional conduit and modification of the utility wiring inside the customer's circuit breaker panel 18.

The meter socket adapter 15 allows electrical line 13a between the solar production meter 12 and the electric utility grid 17 to connect in between the customer's consumption meter 16a and a consumption meter base 16. In some embodiments, the meter socket adapter 15 and automatic transfer switch are integrated into the same housing. An existing meter socket adapter called a "GenerLink" sold by Global Power Products, Inc. of Lawrenceville, Ga. comprises a socket meter adapter 15 with an integrated automatic transfer switch 20. The off-the-shelf "GenerLink" device requires a minor modification—the addition of a connection to the "line side" of the meter such that electrical line 13a is connected through the GenerLink, in front of the customer's consumption meter 16a, to the electric utility grid 17. Alternatively, the automatic transfer switch 20 may be installed before the customer's meter base and connected to the inverter system 7a through conventional electrical conduit as shown in FIG. 6 or FIG. 7.

Figure 5:
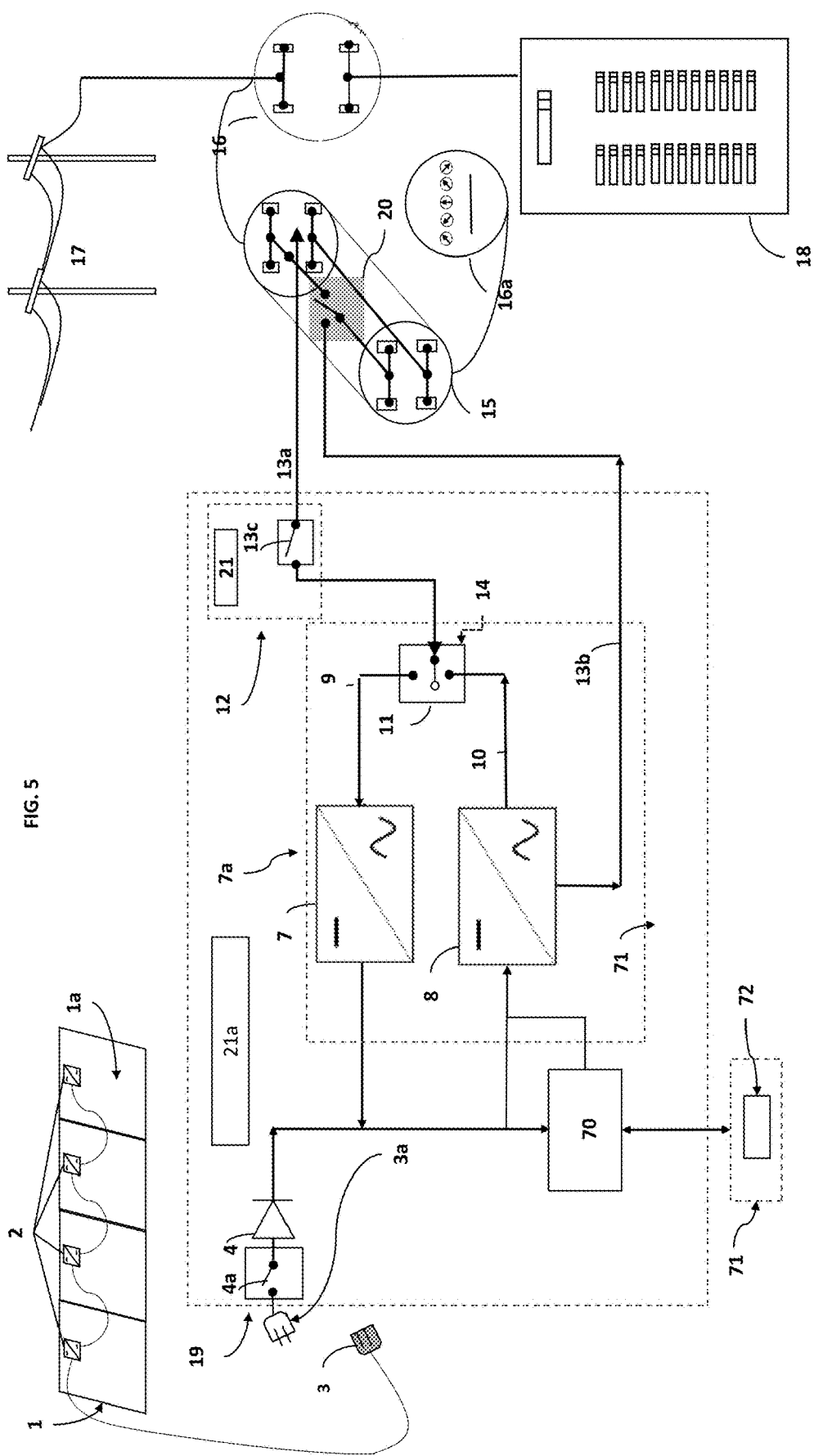
FIG. 5 depicts a schematic view of an alternative embodiment of the invention that utilizes a vehicle battery.

FIG. 5 shows an alternative embodiment of the invention. In place of the battery management system 5 is an Electric Vehicle Service Equipment ("EVSE") 70. The EVSE serves as a communications point that facilitates the transfer of commands, as well as information about the type, voltage, maximum load, etc., of the electrical power flowing to/from an electric vehicle 71 comprising a battery 72. The solar array 1 provides DC power to the EVSE 70. This allows the battery 72 of the electric vehicle 71 to be charged directly by the solar array without having to convert the DC power into AC power and back again into DC power. If, for example, power from the solar array 1 is not available, the battery 72 of the electric vehicle 71 may be charged by power flowing from the grid 17 through the solar production meter 12 through the inverter system 7a and then through the EVSE 70.

Moreover, the battery 72 of the electric vehicle 71 may also be used like battery bank 6 and power the customer's electrical panel 18 during a power outage. Additionally, the battery 72 of the electric vehicle 71 may also in some embodiments be directly charged from the solar array by directly connecting the DC plug 3 to the electric vehicle 71. As with battery bank 6, the battery 72 of the electric vehicle 71 may also provide power to the electric utility grid 17.

This ability is enabled through the use of communication protocols that allow for two-way charging/discharging capabilities built into the vehicle. By using a communication protocol and plug system such as CHAdeMO (e.g., IEC61851-23 & -24, IEC 6219 (configuration AA), IEEE 2030.1.1TM-2015), the inverter system 7a can request power from the battery 72 of the electric vehicle 71 vehicle so that it may be utilized by the inverter system 7a to provide power to the grid 17. CHAdeMO compatible electric vehicles (or vehicles using various other protocols) presently have two-way charging/discharging capabilities built into them.

By using the total AC kWh solar generation for a given period discussed earlier, in conjunction with the consumption data from the customer's consumption meter 16a, a utility company may be paid for 100% of the energy consumed by the customer as registered by meter base 16. Furthermore, the costs of installation of the foregoing embodiment into existing residential or office buildings is minimal because power comes in through the existing meter base 16 and internal wiring changes usually not needed to be made to the customer's circuit breaker panel 18. As such, in many embodiments, the cost of installing a critical load sub-panel can be avoided.

From a practical perspective that takes into consideration the current legal and business structures of electric utilities, there are some advantages present in embodiments where the electric utility has ownership and control of certain parts such as the battery and inverter system 19 (or just the inverter system 7a), the transfer switch, in conjunction with utilization of standard utility metering and its associated automatic metering infrastructure.

To minimize power theft, much or all of this equipment is either under a utility lock or behind a legally authorized seal because electric utilities workers or their contractors are the only ones that are authorized to work on electric utility equipment that is on the utility's side of the electric meter. The point of demarcation of the AC connection between the utility and customer's side of the meter is typically the meter jaws of the meter socket inside the meter base. For larger commercial installations, the point of demarcation may be inside a locked metering cabinet.

On the DC side, the jurisdictional point of demarcation between the electric utility's inverter and the customer's solar array may be the high voltage DC plug 3. Customers could own and be responsible for the installing only the DC portion of their solar PV system that connects to a standard automotive DC electric vehicle plug. The DC plugs can be either the open standard CHAdeMo or Combo Charging System (CCS) plugs, or the proprietary Tesla AC/DC plug. These standard high voltage DC plugs are designed to handle to the 400 to 600 volts. This customer-owned DC plug 3 and utility-owned DC socket form the utility's service point disconnect switch. To disconnect the solar array from the utility-owned inverter, electric utility workers, customers or emergency responders simply unplug the DC plug from the inverter just like they would if they were unplugging an electric vehicle. Electric utilities have the option of locking the cover to the DC socket to prevent unauthorized or unapproved solar power systems from connecting to their system. This same DC plug can also be used to directly charge an electric vehicle using DC power from the solar array, without the need to go through an inverter or install additional equipment.

The foregoing embodiments have been described in the context of a single-family residential dwelling. But the invention is equally applicable to a commercial and industrial settings. The only significant implementation differences being the overall scale and increased power requirements for commercial and industrial settings. For example, FIG. 7 depicts an exemplary industrial setting where a metering cabinet 36 monitors the flow of power utilized by the customer and a meter 36a displays information about the consumption.

While various embodiments of the present invention have been described above, it should be understood that they have been presented by way of example only, and not of limitation. Notably, descriptions with respect to ownership or control (customer, utility, third-parties, etc.) are not to be seen as limitations unless expressly set forth in the claims. Likewise, the various diagrams depict exemplary configurations for certain embodiments invention, which is done to aid in understanding the features and functionality that can be included in the invention. The invention is not restricted to the illustrated examples or configurations, but the desired features can be implemented using a variety of alternative architectures and configurations. Indeed, it will be apparent to one of skill in the art how alternative functional, logical, or physical partitioning and configurations can be implemented to implement (or discard) various features of the present invention.

Although the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above described exemplary embodiments.

What is claimed is:

1. An apparatus comprising:
   a solar panel for generating direct current (DC) power;
   a secondary battery;
   an alternating current (AC) to DC inverter for supplying DC power to charge the secondary battery;
   a DC-to-AC inverter for supplying AC power to either a power grid or an electrical panel, or both;
   a first electrical meter for (1) metering the AC power outputted by the DC-to-AC inverter, and for (2) metering the AC power received from the power grid for charging of the secondary battery;
   a second electrical meter in series with the power grid and an electrical panel, and wherein the second electrical meter does not meter power flowing in either direction between the first electrical meter and the power grid;
   a transceiver for receiving a plurality of types of transmitted signals;
   a switch, wherein in response to a first type of transmitted signal, the switch permits the flow of electrical power from the DC-to-AC inverter to the power grid;
   an automatic transfer switch for connecting the DC-to-AC inverter to the electrical panel in response to a loss of AC power from the power grid; and
   wherein the second electrical meter is on a circuit between the electrical panel and the automatic transfer switch.

2. The apparatus of claim 1 wherein the secondary battery is contained in a vehicle.

3. The apparatus of claim 1 further comprising a meter socket adapter connected in series between the electrical panel and the grid.

\* \* \* \* \*